United States Patent [19]

Totani et al.

[11] 4,014,811
[45] Mar. 29, 1977

[54] NEMATIC LIQUID CRYSTAL COMPOSITIONS

[75] Inventors: Kazuo Totani; Goro Matsumoto; Kazuhito Iwasaki; Toshio Jinnai, all of Kamakura, Japan

[73] Assignee: Dai Nippon Toryo Kabushiki Kaisha, Osaka, Japan

[22] Filed: June 6, 1975

[21] Appl. No.: 584,662

[30] Foreign Application Priority Data

Dec. 28, 1974 Japan ................... 50-665

[52] U.S. Cl. .................. 252/299; 350/160 LC
[51] Int. Cl.$^2$ .................. C09K 3/34; G02F 1/13
[58] Field of Search ............ 252/299, 408 LC; 350/160 LC

[56] References Cited

UNITED STATES PATENTS

| | | | |
|---|---|---|---|
| 3,881,806 | 5/1975 | Suzuki | 252/299 |
| 3,891,307 | 6/1975 | Tsukamoto et al. | 350/160 LC |
| 3,923,857 | 12/1975 | Boller et al. | 252/299 |
| 3,975,286 | 8/1976 | Oh | 252/299 |
| 3,981,817 | 9/1976 | Boller et al. | 252/299 |

FOREIGN PATENTS OR APPLICATIONS

| | | | |
|---|---|---|---|
| 2,415,929 | 10/1974 | Germany | 252/299 |
| 2,359,777 | 6/1974 | Germany | 252/299 |
| 2,321,632 | 11/1974 | Germany | 252/299 |
| 2,306,739 | 8/1973 | Germany | 252/299 |
| 2,024,269 | 12/1971 | Germany | 252/299 |
| 2,327,036 | 12/1973 | Germany | 252/299 |
| 4,934,488 | 3/1974 | Japan | 252/299 |
| 4,978,683 | 7/1974 | Japan | 252/299 |

*Primary Examiner*—Leland A. Sebastian
*Assistant Examiner*—T. S. Gron
*Attorney, Agent, or Firm*—Sughrue, Rothwell, Mion, Zinn & Macpeak

[57] ABSTRACT

Nematic liquid crystal compositions having positive dielectric anisotropy are obtained by mixing at least one of p-n-alkylphenyl-p'-cyanobenzoates represented by the formula,

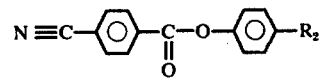

wherein $R_2$ is n-alkyl group of 3 to 8 carbon atoms with at least one of p-cyanophenyl-p'-n-alkylbenzoates represented by the formula,

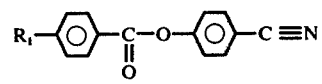

wherein $R_1$ is n-alkyl group of 4 to 8 carbon atoms.

Said compositions exhibit nematic liquid crystal phase over a broad temperature range and therefore, are useful for the torsion effect-type display device.

5 Claims, 2 Drawing Figures

NEMATIC LIQUID CRYSTAL COMPOSITIONS

BACKGROUND OF THE INVENTION:

This invention relates to a new nematic liquid crystal composition having positive dielectric anisotropy.

Nematic liquid crystal compounds or nematic liquid crystal compositions (hereinafter referred to as N-liquid crystal materials) are used for electro-optical display devices, utilizing the phenomenon that they are optically changed if an electric field is applied thereto. Electro-optical display devices with use of the N-liquid crystal material may be divided into two groups according to dieletric anisotropy of the N-liquid crystal material used. One group comprises devices in which there is employed a dynamic scattering mode (DSM), i.e. an optical scattering phenomenon caused by collision of an ion with a domain when an electric field is applied to a N-liquid crystal material having larger dielectric constant in a direction perpendicular to longitudinal axes of the molecules than dielectric constant in the longitudinal direction, i.e. nematic liquid crystal material having negative dielectric anisotropy (hereinafter referred to as Nn-liquid crystal material). Another group comprises devices in which there is employed an electric field effect mode (FEM), i.e. a change in lean or torsion of N-liquid crystal molecules caused by applying an electric field to an N-liquid crystal material having larger dielectric constant in a longitudinal direction of the molecules than that in a direction perpendicular to longitudinal axes of the molecules, i.e. nematic liquid crystal material having positive dielectric anisotropy (hereinafter referred to as Np-liquid crystal material). Many of the latter FEM-type devices are so-called "torsion effect-type display devices" (hereinafter referred to as TN-type display device) wherein a change in torsion of the molecules (one of the electric field effect modes) is utilized. The Np-liquid crystal composition of this invention is utilized for the TN-type display device.

As one of well-known Np-liquid crystal compounds, there are p-cyanophenyl-p'-n-alkylbenzoates having Formula I,

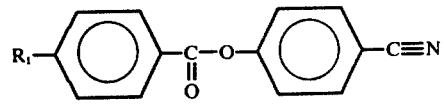

wherein $R_1$ is n-alkyl of 4 to 8 carbons atoms, which is disclosed in Japanese Application Kokai No. 48-96560. The compounds of Formula I are limited in a temperature range exhibiting nematic liquid crystal phase (hereinafter referred to as "mesomorphic range") as set forth in Table I, but Np-liquid crystal compositions having a broad mesomorphic range can be obtained by mixing two or more of these compounds. With reference to a Np-liquid crystal composition consisting of a mixture of two p-cyanophenyl-p'-n-alkylbenzoates, its phase diagram is shown in FIG. 1 and FIG. 2

Table 1

| Np-liquid crystal compounds | Mesomorphic ranges |
| --- | --- |
| $CH_3 \cdot (CH_2)_3$-〈ring〉-COO-〈ring〉-C≡N | m.p. 67° C<br>41.5° C~monotropic |
| $CH_3 \cdot (CH_2)_4$-〈ring〉-COO-〈ring〉-C≡N | m.p. 60.5° C<br>56.5° C~monotropic |
| $CH_3 \cdot (CH_2)_5$-〈ring〉-COO-〈ring〉-C≡N | 45~48° C |
| $CH_3 \cdot (CH_2)_6$-〈ring〉-COO-〈ring〉-C≡N | 44~56.5° C |
| $CH_3 \cdot (CH_2)_7$-〈ring〉-COO-〈ring〉-C≡N | 46.5~53.5° C |

A mixture of three p-cyanophenyl-p'-n-alkylbenzoates has in general a mesomorphic range broader than that of a mixture of two p-cyanophenyl-p'-n-alkylbenzoates. Among them, particularly a mixture in equal parts by weight of p-cyanophenyl-p'-n-butylbenzoate, p-cyanophenyl-p'-n-hexylbenzoate and p-cyanophenyl-p'-n-octylbenzoate has remarkably broad mesomorphic range, i.e. 7 to 47.5° C.

The compounds of the Formula I and mixtures thereof are a Np-liquid crystal material with good chemical stability, but are limited in a mesomorphic range, particularly in a low temperature zone as compared with other Np-liquid crystal materials, for example p-alkylbenzylidene-p'-cyanoanilines of the formula,

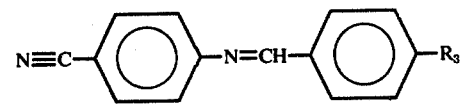

wherein $R_3$ is ethyl, n-propyl, n-butyl, n-pentyl, i-hexyl, n-hexyl, n-heptyl and n-octyl, and mixtures thereof. For this reason, the Np-liquid crystal materials of Formula I are prevented from the use in the TN-type display device.

SUMMARY OF THE INVENTION

An object of this invention is to provide useful Np-liquid crystal compositions for the TN-type display device, which exhibit nematic liquid crystal phase over a broad temperature range.

The foregoing can be attained by mixing (A) at least one of p-cyanophenyl-p'-n-alkylbenzoates of the Formula I with (B) at least one of p-n-alkylphenyl-p'-cyanobenzoate represented by Formula II,

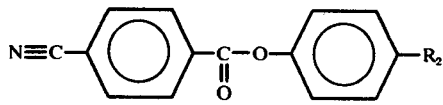
II wherein $R_2$ is n-alkyl of 3 to 8 carbon atoms to form Np-liquid crystal compositions, an amount of said component B being within the range of not more than about 30% by weight based on the total amount of the composition.

DETAILED DESCRIPTION OF THE INVENTION

Figure 1:
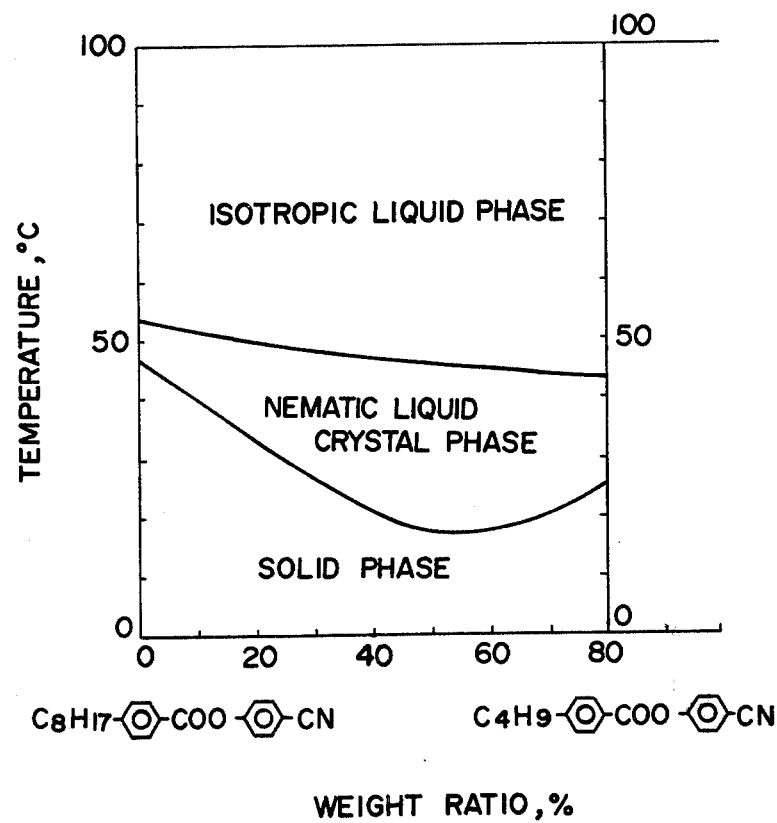
FIG. 1 represents a phase diagram of an Np-liquid crystal composition consisting of p-cyanophenyl-p'-n-butylbenzoate and p-cyanophenyl-p'-n-octylbenzoate.
Figure 2:
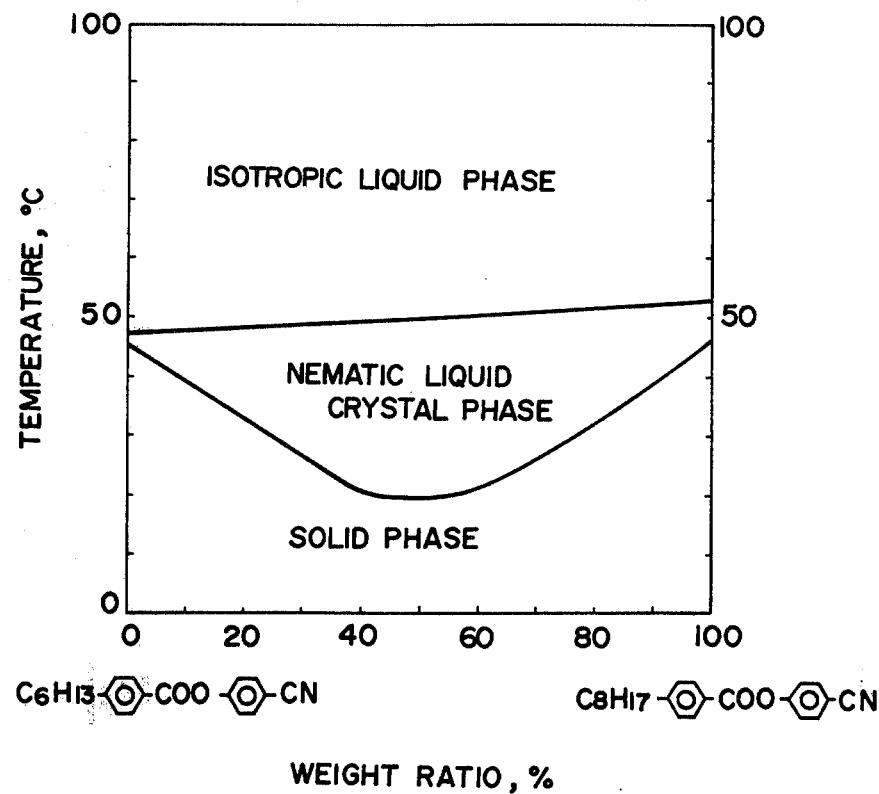
FIG. 2 represents a phase diagram of a Np-liquid crystal composition consisting of p-cyanophenyl-p'-n-hexylbenzoate and p-cyanophenyl-p'-n-octylbenzoate.

In accordance with this invention, by mixing at least one of the compounds of the Formula I and at least one of the compounds of the Formula II in amounts as defined above, there are provided Np-liquid crystal compositions which have a broad mesomorphic range, particularly broadened in a low temperature zone as compared with that of the Np-liquid crystal material of the Formula I.

The compounds of the Formula II themselves are a Np-liquid crystal material and are characteristic of monotropy except p-n-octylphenyl-p'-cyanobenzoate.

Mesomorphic ranges of these compounds are given in Table 2.

Table 2

| Np-liquid crystal compounds | Mesomorphic ranges |
|---|---|
| N≡C—⟨O⟩—C(=O)—O—⟨O⟩—(CH$_2$)$_2$.CH$_3$ | m.p. 80° C<br>68° C~monotropic |
| N≡C—⟨O⟩—C(=O)—O—⟨O⟩—(CH$_2$)$_3$.CH$_3$ | m.p. 75° C<br>59° C~monotropic |
| N≡C—⟨O⟩—C(=O)—O—⟨O⟩—(CH$_2$)$_4$.CH$_3$ | m.p. 93° C<br>73° C~monotropic |
| N≡C—⟨O⟩—C(=O)—O—⟨O⟩—(CH$_2$)$_5$.CH$_3$ | m.p. 73° C<br>70° C~monotropic |
| N≡C—⟨O⟩—C(=O)—O—⟨O⟩—(CH$_2$)$_6$.CH$_3$ | m.p. 78° C<br>73° C~monotropic |
| N≡C—⟨O⟩—C(=O)—O—⟨O⟩—(CH$_2$)$_7$.CH$_3$ | 66~71° C |

The p-n-alkylphenyl-p'-cyanobenzoates of the Formula II may, for example, be prepared by mixing p-cyanobenzoyl chloride and p-n-alkylphenol in equal molar amounts, heating the mixture in anhydrous pyridine and benzene while stirring, and after extraction with ether, washing the reaction product with dilute hydrochloric acid, aqueous solution of sodium hydroxide and then water.

The above reaction may be illustrated as follows:

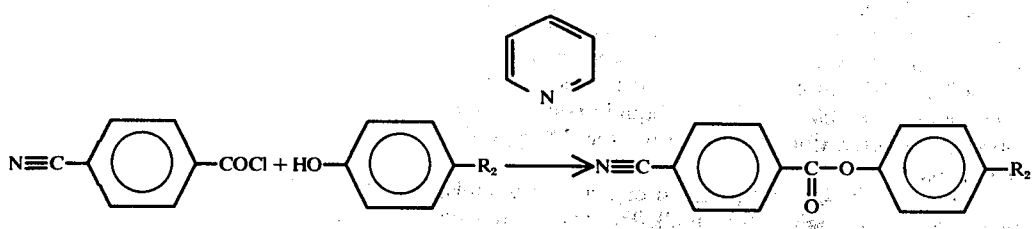

The starting p-n-alkylphenol may be obtained by preparing the diazonium salt from p-n-alkylaniline and then hydrolyzing same. p-n-Alkylphenyl-p'-cyanobenzoates obtained thus are purified by repeating recrystallization from ethanol. These compounds are chemically stable and exhibit good miscibility with p-cyanophenyl-p'-n-alkylbenzoates.

In the Np-liquid crystal composition of this invention, p-n-alkylphenyl-p'-cyanobenzoates (component B) should be in an amount of not more than about 30% by weight based on the total amount of the composition. When the amount is more than about 30% by weight, the resulting composition becomes narrower in the mesomorphic range than p-cyanophenyl-p'-n-alkylbenzoates (component A) alone and therefore, the object of this invention can not be attained. Particularly, when the amount of the component B is within the range of about 10 to 25% by weight, compositions having broader mesomorphic range can be obtained.

In accordance with particularly, preferred embodiments of this invention, there are provided Np-liquid crystal compositions having remarkably broad mesomorphic range, which consist of a mixture in equal parts by weight of p-cyanophenyl-p'-n-butylbenzoate, p-cyanophenyl-p'-n-hexylbenzoate and p-cyanophenyl-p'-n-octylbenzoate as the component A and p-n-butylphenyl-p'-cyanobenzoate, p-n-hexylphenyl-p'-cyanobenzoate or p-n-octylphenyl-p'-cyanobenzoate as the component B in the amount as defined above.

The Np-liquid crystal compositions of this invention are chemically stable and have the mesomorphic range broader particularly, in a low temperature zone than that of p-cyanophenyl-p'-n-alkylbenzoates of the component A, and therefore, are useful for the TN-type display device.

This invention will be illustrated by the following non-limitative examples.

p-n-Alkylphenyl-p'-cyanobenzoates (component B) used in the examples were prepared in accordance with the process as described hereinbefore.

EXAMPLE 1

A Np-liquid crystal composition having a mesomorphic range of 34° to 49.0° was obtained by mixing 80% by weight of p-cyanophenyl-p'-n-hexylbenzoate (mesomorphic range: 45°~48° C) and 20% by weight of p-n-butylphenyl-p'-cyanobenzoate in a nitrogen atmosphere while heating at about 100° C and stirring.

Similarly, Np-liquid crystal compositions were obtained by mixing the components A and B as set forth in Table 3. Mesomorphic ranges of these compositons are also in Table 3.

Table 3

| Component A p-cyanophenyl-p'-n-alkylbenzoates | Component B p-n-alkylphenyl-p'-cyanobenzoates | Weight Ratio | Mesomorphic Ranges, ° C |
|---|---|---|---|
| CH₃.(CH₂)₅—⌬—C(=O)—O—⌬—C≡N (45~48° C) | N≡C—⌬—C(=O)—O—⌬—(CH₂)₃.CH₃ | 80:20 | 34~49.0 |
|  | N≡C—⌬—C(=O)—O—⌬—(CH₂)₅.CH₃ | 80:20 | 37~49.5 |
|  | N≡C—⌬—C(=O)—O—⌬—(CH₂)₇.CH₃ | 80:20 | 35~51.0 |
| CH₃.(CH₂)₆—⌬—C(=O)—O—⌬—C≡N (44~56.5° C) | N≡C—⌬—C(=O)—O—⌬—(CH₂)₂.CH₃ | 80:20 | 37~58.0 |
|  | N≡C—⌬—C(=O)—O—⌬—(CH₂)₄.CH₃ | 80:20 | 38~59.5 |
|  | N≡C—⌬—C(=O)—O—⌬—(CH₂)₆.CH₃ | 80:20 | 38~59.0 |
| CH₃.(CH₂)₇—⌬—C(=O)—O—⌬—C≡N (46.5~53.5° C) | N≡C—⌬—C(=O)—O—⌬—(CH₂)₇.CH₃ | 95:5<br>90:10<br>85:15<br>80:20<br>75:25<br>70:30 | 46~54.0<br>45~55.0<br>34~55.5<br>33~56.5<br>34~57.0<br>38~57.5 |

EXAMPLE 2

A Np-liquid crystal composition having a mesomorphic range of 24 to 51° C was obtained by mixing 1 part by weight of p-cyanophenyl-p'-n-hexylbenzoate and 2 parts by weight of p-cyanophenyl-p'-n-octylbenzoate in a nitrogen atmosphere while heating at about 100° C and stirring.

Next, by mixing 80% by weight of said composition and 20% by weight of p-n-propylphenyl-p'-cyanobenzoate in the same way as the above, a Np-liquid crystal composition having a mesomorphic range of 14° to 54° C was obtained.

Similarly, Np-liquid crystal compositions were obtained by mixing the components A and B as set forth in Table 4. Mesomorphic ranges of these compositions are also given in Table 4.

Table 4

| Component A Mixtures of p-cyanophenyl-p'-n-alkylbenzoates | Component B p-n-alkylphenyl-p'-cyanobenzoates | Weight Ratio | Mesomorphic Ranges, °C |
|---|---|---|---|
| CH$_3$·(CH$_2$)$_5$—〇—C(=O)—O—〇—C≡N : CH$_3$·(CH$_2$)$_7$—〇—C(=O)—O—〇—C≡N = 1:2 (24~51° C) | N≡C—〇—C(=O)—O—〇—(CH$_2$)$_2$·CH$_3$ | 80:20 | 14~54 |
| | N≡C—〇—C(=O)—O—〇—(CH$_2$)$_3$·CH$_3$ | 80:20 | 13~53 |
| | N≡C—〇—C(=O)—O—〇—(CH$_2$)$_4$·CH$_3$ | 80:20 | 16~56 |
| | N≡C—〇—C(=O)—O—〇—(CH$_2$)$_5$·CH$_3$ | 80:20 | 13~54 |
| | N≡C—〇—C(=O)—O—〇—(CH$_2$)$_6$·CH$_3$ | 80:20 | 16~55 |
| | N≡C—〇—C(=O)—O—〇—(CH$_2$)$_7$·CH$_3$ | 80:20 | 15~54 |
| CH$_3$·(CH$_2$)$_3$—〇—C(=O)—O—〇—C≡N : CH$_3$·(CH$_2$)$_7$—〇—C(=O)—O—〇—C≡N = 1:2 (23~48° C) | N≡C—〇—C(=O)—O—〇—(CH$_2$)$_3$·CH$_3$ | 80:20 | 13~51 |
| | N≡C—〇—C(=O)—O—〇—(CH$_2$)$_5$·CH$_3$ | 80:20 | 14~53 |
| | N≡C—〇—C(=O)—O—〇—(CH$_2$)$_7$·CH$_3$ | 80:20 | 14~53 |
| CH$_3$·(CH$_2$)$_3$—〇—C(=O)—O—〇—C≡N : CH$_3$·(CH$_2$)$_6$—〇—C(=O)—O—〇—C≡N = 1:2 (22~51° C) | N≡C—〇—C(=O)—O—〇—(CH$_2$)$_2$·CH$_3$ | 80:20 | 14~54 |
| | N≡C—〇—C(=O)—O—〇—(CH$_2$)$_3$·CH$_3$ | 80:20 | 13~56 |
| | N≡C—〇—C(=O)—O—〇—(CH$_2$)$_4$·CH$_3$ | 80:20 | 15~56 |
| | N≡C—〇—C(=O)—O—〇—(CH$_2$)$_6$·CH$_3$ | 80:20 | 14~55 |

EXAMPLE 3

A Np-crystal composition having a mesomorphic range of 7° to 47.5° C was obtained by mixing p-cyanophenyl-p'-n-butylbenzoate, p-cyanophenyl-p'-n-hexylbenzoate and p-cyanophenyl-p'-n-octylbenzoate in equal parts by weight in a nitrogen atmosphere while heating at about 100° C and stirring (hereinafter referred to as Composition I). Next, by mixing 80% by weight of Composition I and 20% by weight of p-n-hexylphenyl-p'-cyanobenzoate in the same way as the above, a Np-liquid crystal compositon having a mesomorphic range of −3° to 49.5° C was obtained.

Also, a Np-liquid crystal composition having a mesomorphic range of 20° to 51.5° C was obtained by mixing p-cyanophenyl-p'-n-hexylbenzoate, p-cyanophenyl-p'-n-heptylbenzoate and p-cyanophenyl-p'-n-octylbenzoate in equal parts by weight in a nitrogen atmosphere while heating at about 100° C and stirring (hereinafter referred to as Composition II). Then, by mixing 80% by weight of Composition II and 20% by weight of p-n-hexylphenyl-p'-cyanobenzoate in the same manner as the above, a Np-liquid crystal composition having a mesomorphic range of 15° to 55.0° C was obtained.

Table 5 shows mesomorphic ranges of Np-liquid crystal compositions obtained by mixing Compositions I or II (component A) with one of p-n-alkylphenyl-p'-cyanobenzoates (component B).

Table 5

| Component A Mixtures of p-cyanophenyl-p'-n-alkylbenzoates | Component B p-n-alkylphenyl-p'-cyanobenzoates | Weight Ratio | Mesomorphic Ranges, °C |
|---|---|---|---|
| | N≡C—⟨○⟩—C(=O)—O—⟨○⟩—(CH₂)₅·CH₃ | 95:5 | 5~47.5 |
| | | 90:10 | 3~49.0 |
| | | 85:15 | 0~49.0 |
| Composition I (7~47.5° C) | | 80:20 | −3~49.5 |
| | | 75:25 | −1~50.0 |
| | | 70:30 | 8~52.0 |
| | N≡C—⟨○⟩—C(=O)—O—⟨○⟩—(CH₂)₂·CH₃ | 80:20 | 2~51.5 |
| | N≡C—⟨○⟩—C(=O)—O—⟨○⟩—(CH₂)₃·CH₃ | 80:20 | −1~49.5 |
| | N≡C—⟨○⟩—C(=O)—O—⟨○⟩—(CH₂)₆·CH₃ | 80:20 | 2~52.0 |
| | N≡C—⟨○⟩—C(=O)—O—⟨○⟩—(CH₂)₇·CH₃ | 80:20 | −3~51.5 |
| Composition II (20~51.5° C) | N≡C—⟨○⟩—C(=O)—O—⟨○⟩—(CH₂)₅·CH₃ | 80:20 | 15~55.0 |
| | N≡C—⟨○⟩—C(=O)—O—⟨○⟩—(CH₂)₆·CH₃ | 80:20 | 15~56.0 |
| | N≡C—⟨○⟩—C(=O)—O—⟨○⟩—(CH₂)₇·CH₃ | 80:20 | 15~55.5 |

EXAMPLE 4

A Np-liquid crystal composition having a mesomorphic range of 10° to 53° C was obtained by mixing 80% by weight of the Composition II of Example 3, 10% by weight of p-n-propylphenyl-p'-cyanobenzoate and 10% by weight of p-n-butylphenyl-p'-cyanobenzoate in a nitrogen atmosphere while heating at about 100° C and stirring.

Similarly, Np-liquid crystal compositions were obtained by mixing the Composition II (component A) and two p-n-alkylphenyl-p'-cyanobenzoates (component B) as set forth in Table 6. Mesomorphic ranges of these compositions are also set forth in Table 6.

Table 6

| Component A Mixture of p-cyanophenyl-p'-n-alkylbenzoates | Component B p-n-alkylphenol-p'-cyanobenzoates | Weight Ratio | Mesomorphic Ranges, °C |
|---|---|---|---|
| | N≡C—⟨○⟩—C(=O)—O—⟨○⟩—(CH₂)₂·CH₃ : N≡C—⟨○⟩—C(=O)—O—⟨○⟩—(CH₂)₃·CH₃ = 1:1 N≡C—⟨○⟩—C(=O)—O—⟨○⟩—(CH₂)₅·CH₃ : | 80:20 | 10~53 |

Table 6-continued

| Component A Mixture of p-cyanophenyl-p'-n-alkylbenzoates | Component B p-n-alkylphenol-p'-cyanobenzoates | Weight Ratio | Mesomorphic Ranges, °C |
|---|---|---|---|
| Composition II (20~51.5° C) | $N\equiv C-\bigcirc-\underset{O}{\overset{\parallel}{C}}-O-\bigcirc-(CH_2)_3 \cdot CH_3$ = 1:1 | 80:20 | 13~53 |
| | $N\equiv C-\bigcirc-\underset{O}{\overset{\parallel}{C}}-O-\bigcirc-(CH_2)_5 \cdot CH_3$ : | | |
| | $N\equiv C-\bigcirc-\underset{O}{\overset{\parallel}{C}}-O-\bigcirc-(CH_2)_6 \cdot CH_3$ = 1:1 | 80:20 | 10~55 |
| | $N\equiv C-\bigcirc-\underset{O}{\overset{\parallel}{C}}-O-\bigcirc-(CH_2)_5 \cdot CH_3$ : | | |
| | $N\equiv C-\bigcirc-\underset{O}{\overset{\parallel}{C}}-O-\bigcirc-(CH_2)_7 \cdot CH_3$ = 1:1 | 80:20 | 13~56 |

What we claim is:

1. A nematic liquid crystal composition consisting essentially of (A) a mixture in equal parts by weight of p-cyanophenyl-p'-n-butylbenzoate, p-cyanophenyl-p'-n-hexylbenzoate and p-cyanophenyl-p'-n-octylbenzoate and (B) at least one of p-n-alkylphenyl-p'-cyanobenzoates selected from the group consisting of p-n-butylphenyl-p'-cyanobenzoate, p-n-hexylphenyl-p'-cyanobenzoate and p-n-octylphenyl-p'-cyanobenzoate

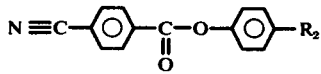

said component B being present in an amount of not more than about 30% by weight based on the total amount of the composition.

2. The Nematic liquid crystal composition of claim 1 wherein said amount of component B is within the range of about 10% to 25% by weight.

3. The Nematic liquid crystal composition of claim 2 wherein said component B is p-n-butylphenyl-p'-cyanobenzoate.

4. The Nematic liquid crystal composition of claim 2 wherein said component B is p-n-hexylphenyl-p'-cyanobenzoate.

5. The Nematic liquid crystal composition of claim 2 wherein said component B is p-n-octylphenyl-p'cyanobenzoate.

* * * * *